United States Patent
Tamaki et al.

(10) Patent No.: US 10,295,931 B2
(45) Date of Patent: May 21, 2019

(54) DEVELOPING DEVICE, AND IMAGE FORMING APPARATUS AND PROCESS CARTRIDGE INCORPORATING SAME

(71) Applicants: Shinji Tamaki, Tokyo (JP); Ichiro Kadota, Kanagawa (JP); Keiichi Yoshida, Kanagawa (JP); Hiroshi Hosokawa, Kanagawa (JP)

(72) Inventors: Shinji Tamaki, Tokyo (JP); Ichiro Kadota, Kanagawa (JP); Keiichi Yoshida, Kanagawa (JP); Hiroshi Hosokawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/022,860

(22) Filed: Jun. 29, 2018

(65) Prior Publication Data

US 2019/0033749 A1    Jan. 31, 2019

(30) Foreign Application Priority Data

Jul. 31, 2017    (JP) ................................. 2017-148656

(51) Int. Cl.
*G03G 15/08*    (2006.01)
*H04N 1/00*    (2006.01)

(52) U.S. Cl.
CPC ..... *G03G 15/0865* (2013.01); *G03G 15/0808* (2013.01); *H04N 1/00557* (2013.01)

(58) Field of Classification Search
CPC ................ G03G 15/0865; G03G 15/0808
See application file for complete search history.

(56) References Cited

U.S. PATENT DOCUMENTS

| | | |
|---|---|---|
| 5,486,909 A | 1/1996 | Takenaka et al. |
| 5,489,747 A | 2/1996 | Takenaka et al. |
| 5,552,870 A | 9/1996 | Murakami et al. |
| 5,617,191 A | 4/1997 | Murakami et al. |
| 5,625,438 A | 4/1997 | Sugiyama et al. |
| 5,625,440 A | 4/1997 | Matsumae et al. |
| 5,625,441 A | 4/1997 | Sugiyama et al. |
| 5,627,630 A | 5/1997 | Matsumae et al. |
| 5,666,625 A | 9/1997 | Komatsubara et al. |
| 5,689,782 A | 11/1997 | Murakami et al. |

(Continued)

FOREIGN PATENT DOCUMENTS

| | | |
|---|---|---|
| JP | 5-107909 | 4/1993 |
| JP | 2014-186291 | 10/2014 |

(Continued)

*Primary Examiner* — Gregory H Curran
(74) *Attorney, Agent, or Firm* — Harness, Dickey & Pierce, P.L.C.

(57) ABSTRACT

A developing device includes a casing to contain developer and define a developer circulation passage, a developing roller to bear the developer, and at least one developer conveyor to convey the developer. The developer conveyor is disposed in the developer circulation passage and lower than the developing roller. The developing device satisfies M1/L2>0.56 g/cm and M1/M2>0.50, where M1 represents an amount of developer borne on the developing roller, L1 represents a width in which the developing roller bears the developer in a longitudinal direction of the developing roller; and M2 represents an amount of developer stored in the casing and excluding the amount of developer borne.

7 Claims, 11 Drawing Sheets

(56) References Cited

U.S. PATENT DOCUMENTS

| | | | |
|---|---|---|---|
| 5,697,026 A | 12/1997 | Matsumae et al. | |
| 5,708,942 A | 1/1998 | Sugiyama et al. | |
| 5,826,144 A | 10/1998 | Takenaka et al. | |
| 10,108,110 B2* | 10/2018 | Hori | G03G 15/0891 |
| 2003/0170046 A1* | 9/2003 | Sato | G03G 15/0894 |
| | | | 399/109 |
| 2011/0008073 A1 | 1/2011 | Kudo et al. | |
| 2011/0026973 A1 | 2/2011 | Hosokawa et al. | |
| 2011/0058858 A1 | 3/2011 | Fukuda et al. | |
| 2011/0150525 A1 | 6/2011 | Fujiwara et al. | |
| 2011/0176820 A1 | 7/2011 | Kadota et al. | |
| 2011/0249991 A1 | 10/2011 | Hosokawa et al. | |
| 2012/0051793 A1 | 3/2012 | Kudo et al. | |
| 2013/0216250 A1 | 8/2013 | Seki et al. | |
| 2014/0016960 A1 | 1/2014 | Miyoshi et al. | |
| 2014/0233984 A1 | 8/2014 | Miyoshi et al. | |
| 2015/0147094 A1 | 5/2015 | Kadota et al. | |
| 2016/0062274 A1 | 3/2016 | Kadota et al. | |
| 2017/0090342 A1 | 3/2017 | Ohhira et al. | |
| 2017/0115604 A1 | 4/2017 | Hosokawa et al. | |
| 2017/0115605 A1 | 4/2017 | Yoshida et al. | |
| 2017/0160675 A1 | 6/2017 | Kadota et al. | |
| 2017/0293257 A1 | 10/2017 | Ohhira et al. | |
| 2018/0120737 A1 | 5/2018 | Okamoto et al. | |
| 2018/0136586 A1 | 5/2018 | Tsuchiya et al. | |
| 2018/0143568 A1 | 5/2018 | Ohhira et al. | |

FOREIGN PATENT DOCUMENTS

| | | |
|---|---|---|
| JP | 2015-215369 | 12/2015 |
| JP | 2017-102383 | 6/2017 |

* cited by examiner

DEVELOPING DEVICE, AND IMAGE FORMING APPARATUS AND PROCESS CARTRIDGE INCORPORATING SAME

CROSS-REFERENCE TO RELATED APPLICATIONS

This patent application is based on and claims priority pursuant to 35 U.S.C. § 119(a) to Japanese Patent Application No. 2017-148656, filed on Jul. 31, 2017, in the Japan Patent Office, the entire disclosure of which is hereby incorporated by reference herein.

BACKGROUND

Technical Field

This disclosure generally relates to an image forming apparatus such as a copier, a printer, a facsimile machine, a multifunction peripheral (MFP) having at least two of copying, printing, facsimile transmission, plotting, and scanning capabilities, or a digital direct platemaking machine; and a developing device and a process cartridge incorporated therein.

Description of the Related Art

In electrophotographic image forming apparatuses, widely used is a developing device including two or more conveying screws to circulate developer in the developing device. In such a developing device, the developer is supplied to a developing roller from one of the conveying screws adjacent to the developing roller and collected from the developing roller after developing operation is performed. Then, the collected developer is stirred and mixed with the developer inside a casing (i.e., a developer container) of the developing device.

SUMMARY

According to an embodiment of this disclosure, a developing device includes a casing to contain developer and define a developer circulation passage, a developing roller to bear the developer, and at least one developer conveyor to convey the developer. The developer conveyor is disposed in the developer circulation passage and lower than the developing roller. The developing device satisfies M1/L1>0.56 g/cm and M1/M2>0.50, where M1 represents an amount of developer borne on the developing roller, L1 represents a width in which the developing roller bears the developer in a longitudinal direction of the developing roller; and M2 represents an amount of developer stored in the casing and excluding the amount of developer borne.

According to another embodiment, an image forming apparatus includes the developing device described above.

According to yet another embodiment, a process cartridge includes an image bearer to bear an image; and the developing device described above, to develop the image on the image bearer. In the process cartridge, at least the developing roller and the image bearer are united together as a unit to be attached to and removed from an image forming apparatus.

According to yet another embodiment, an image forming apparatus includes the process cartridge described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
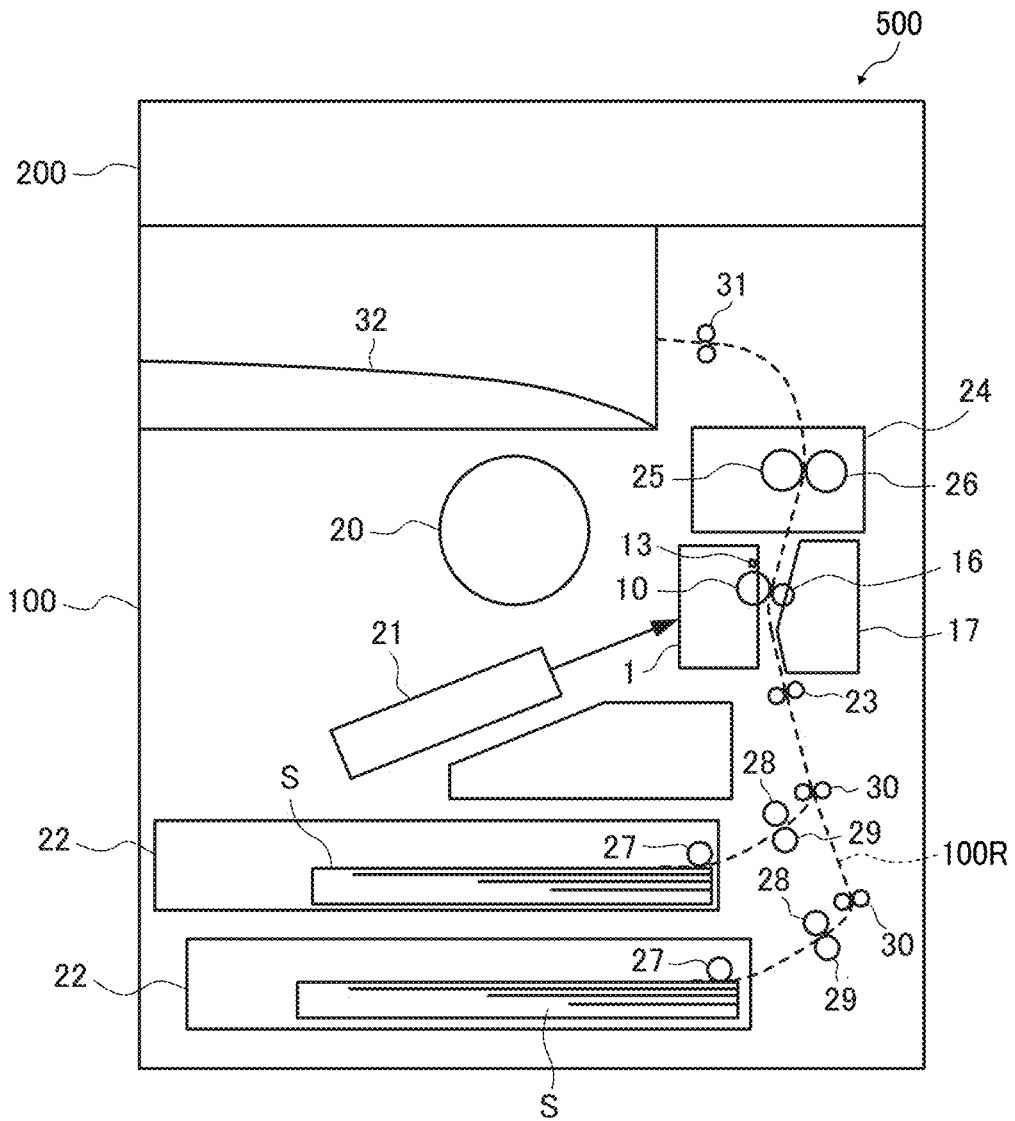
FIG. 1 is a cross-sectional view illustrating a schematic configuration of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a developing device filled with developer to such a level that the conveying screw is hidden by the developer, the developer can be drawn up to the developing roller by the magnetic force of the developing roller even in a state where the conveying screw is stopped.

However, recently, reducing the amount of developer in the developing device is desired for reducing environmental loads. If the amount of developer is significantly reduced (for example, about 50% of the above-described example), the efficiency of transfer from the conveying screw to the developing roller lowers, and the amount of developer upstream from the developer regulation becomes insufficient. Further, the amount of developer drawn up onto the developing roller fluctuates, corresponding to a screw thread period of the conveying screw, causing density unevenness like diagonal lines in developed images.

Referring now to the drawings, wherein like reference numerals designate identical or corresponding parts throughout the several views thereof, and particularly to FIG. 1, an image forming apparatus according to an embodiment of this disclosure is described. As used herein, the singular forms "a", "an", and "the" are intended to include the plural forms as well, unless the context clearly indicates otherwise.

FIG. 1 is a schematic view of an image forming apparatus 500 according to an embodiment. For example, the image forming apparatus 500 is a copier and includes a scanner 200 (i.e., an image reading device) disposed above an apparatus body 100. The apparatus body 100 includes a process cartridge 1.

The apparatus body 100 includes a plurality of sheet trays 22 stacked one on another, pickup rollers 27, sheet feeding rollers 28, and separation rollers 29. The sheet tray 22 accommodates sheets S. The pickup roller 27 picks up the sheets S from the sheet tray 22. Then, the sheet feeding roller 28 and the separation roller 29 separate the sheets S one by one and send the sheet S to a sheet feeding passage 100R.

Through the sheet feeding passage 100R, the sheet S is conveyed to a sheet stack section 32 and various rollers, such as conveyance roller pairs 30, a registration roller pair 23, a sheet ejection roller pair 31 and the like, are disposed along the sheet feeding passage 100R.

In FIG. 1, a transfer roller 16 (a transfer member) of a transfer device 17 is pressed against the surface (extending in the perimeter) of a photoconductor 10. The transfer device 17 transfers a toner image on the photoconductor 10 onto the sheet S conveyed through the sheet feeding passage 100R. A fixing device 24 is disposed above the transfer device 17. The fixing device 24 includes a heating roller 25 and a pressure roller 26. The heating roller 25 and the pressure roller 26 of the fixing device 24 fix the toner image on the sheet S with heat and pressure. Further, the sheet ejection roller pair 31 discharges the sheet S bearing the toner image fixed by the fixing device 24 onto the sheet stack section 32.

The apparatus body 100 further includes a laser writing device 21 (a latent image forming device) including a laser light source. The laser writing device 21 includes the laser light source, a polygon mirror for scanning, a polygon motor, and an f-θ lens. The sheet trays 22 accommodate sheets S such as transfer sheets, film, cloth, glass plates, metal plates, and the like.

Descriptions are given below of copying using the image forming apparatus 500 having the above-described structure. When a user presses a start switch, the scanner 200 reads contents of a document set therein. At the same time, the photoconductor 10 is rotated by a photoconductor driving motor, and a charging device 11 (illustrated in FIG. 2B) uniformly charges the surface of the photoconductor 10. The charging device 11 employs a charging roller 11a. Subsequently, the laser writing device 21 emits a laser beam according to the contents of the document scanned by the scanner 200, thus writing an electrostatic latent image on the photoconductor 10, after which a developing device 12 (illustrated in FIG. 2B) supplies toner to the electrostatic latent image to visualize (develop) the electrostatic latent image.

Additionally, simultaneously with pressing of the start switch by the user, the pickup roller 27 sends out the sheet S from the selected one of the sheet trays 22. One sheet S is separated from the rest by the sheet feeding roller 28 and the separation roller 29 and fed to the sheet feeding passage 100R. In the sheet feeding passage 100R, multiple conveyance roller pairs 30 transport the sheet S, and the sheet S is caught in a nip of the registration roller pair 23. The registration roller pair 23 forwards the sheet S to a transfer nip, where the transfer roller 16 contacts the photoconductor 10, timed to coincide with the arrival of the toner image (a visible image) on the photoconductor 10.

In the transfer nip, the transfer device 17 transfers the toner image onto the sheet S from the photoconductor 10. A cleaning device 14 (see FIG. 2B) removes the toner remaining on the photoconductor 10 after the image transfer, and a discharger 13 (see FIG. 2B) removes residual potentials from the photoconductor 10. Then, the apparatus is prepared for subsequent image formation started by the charging device 11.

Meanwhile, the sheet S is guided to the fixing device 24. While passing between the heating roller 25 and the pressure roller 26, the sheet S is heated and pressed to fix the toner image on the sheet S. Subsequently, the sheet ejection roller pair 31 discharges the sheet S to the sheet stack section 32.

Figure 2A:
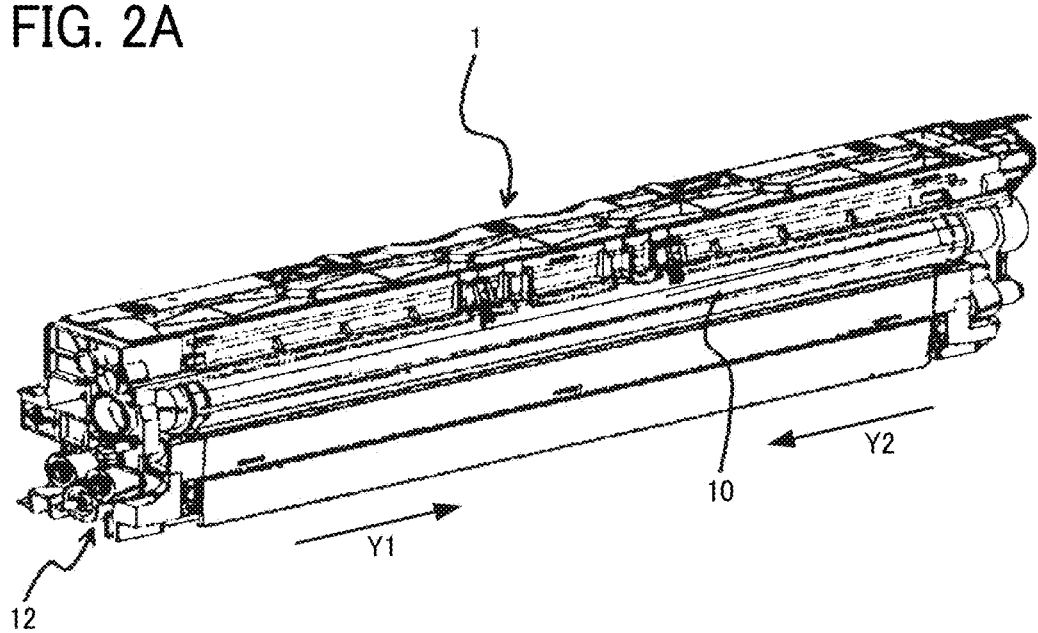
FIG. 2A is a perspective view of a process cartridge according to an embodiment.
Figure 2B:
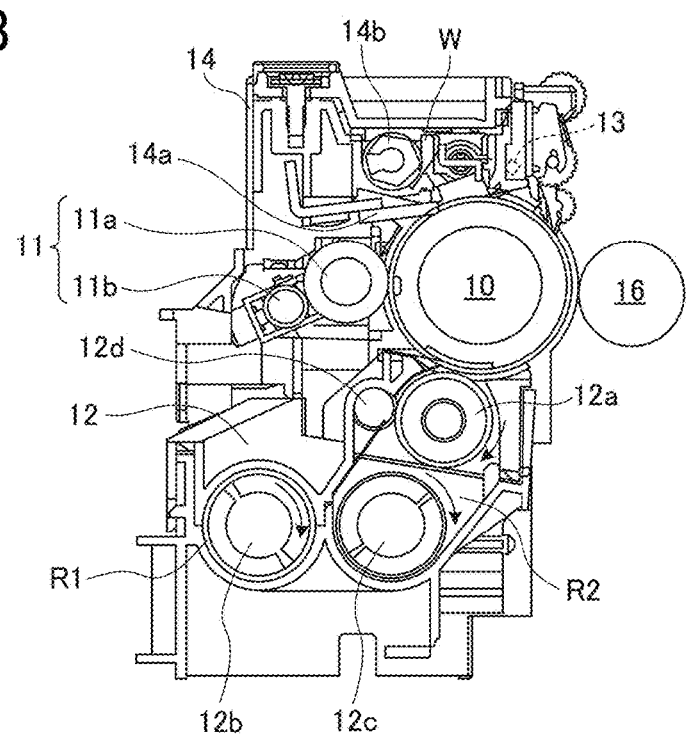
FIG. 2B is an end-on axial view of the process cartridge illustrated in FIG. 2A.

FIG. 2A is a perspective view of the process cartridge 1, and FIG. 2B is a cross-sectional view of the process cartridge 1.

As illustrated in FIG. 2B, the process cartridge 1 includes the photoconductor 10 serving as a latent image bearer. Around the photoconductor 10, the charging device 11, the developing device 12, and the cleaning device 14 are disposed, housed in a common holder. The process cartridge 1 is removably mountable in the apparatus body 100 illustrated in FIG. 1. When the photoconductor 10, the charging device 11, the developing device 12, and the cleaning device 14 are united into the process cartridge 1 as a single unit, replacement work and maintenance work can be easier. Further, the process cartridge 1 includes side plates at both longitudinal ends thereof to secure each device in the process cartridge 1. Therefore, the relative positions of the components of the process cartridge 1 are kept with a higher degree of accuracy, thus enhancing the quality of images after development by the developing device 12.

The charging device 11 includes the charging roller 11a (a charger) and a removing roller 11b. As a charging bias is applied to the charging roller 11a, the charging roller 11a gives electrical charges to the surface of the photoconductor 10 to uniformly charge the photoconductor 10. The removing roller 11b removes substances, such as toner, adhering to the surface of the charging roller 11a.

The developing device 12 includes a developing roller 12a and a first developer compartment R1 (a developer containing compartment), in which a first conveying screw 12b serving as a developer conveyor is disposed. The developing device 12 further includes a second developer compartment R2, in which a second conveying screw 12c serving as another developer conveyor, the developing roller 12a serving as a developer bearer, and a developer doctor 12d serving as a developer regulator are disposed. The second conveying screw 12c is disposed closer to the developing roller 12a than the first conveying screw 12b. That is, the second conveying screw 12c is the closer (to the developing roller 12a) of the two developer conveyers. Specifically, the distance between the central axis of the second conveying screw 12c and the central axis of the developing roller 12a is shorter than the distance between the central axis of the first conveying screw 12b and the central axis of the developing roller 12a.

The first and second developer compartments R1 and R2 contain two-component developer including magnetic carrier and negatively charged toner. As the first conveying screw 12b rotates, driven by a driving motor (a driver), the first conveying screw 12b conveys the developer in the first developer compartment R1 to the front side of the sheet on which FIG. 2B is drawn (in FIG. 2A, from the left to the right as indicated by arrow Y1), while agitating the developer. At the end of the first developer compartment R1 on the front side of the sheet on which FIG. 2B is drawn, the developer transported by the first conveying screw 12b enters the second developer compartment R2.

Being rotated by the driver, the second conveying screw 12c inside the second developer compartment R2 transports the developer to the back side of the sheet on which FIG. 2B is drawn. The developing roller 12a is disposed above (or higher than) the second conveying screw 12c and parallel to the second conveying screw 12c. The developing roller 12a includes a nonmagnetic developing sleeve 12a1 that rotates and a stationary magnet roller 12a2 (both illustrated in FIG. 6) disposed inside the developing sleeve 12a1.

A portion of the developer transported by the second conveying screw 12c in the longitudinal direction of the developing device 12 is scooped onto the surface of the developing roller 12a and carried thereon due to the magnetic force exerted by the magnet roller 12a2. After the developer doctor 12d, which is disposed across a predetermined gap from the surface of the developing roller 12a, adjusts the thickness of a layer of developer carried on the developing roller 12a, the developer is transported to a developing range opposed to the photoconductor 10. Then, the toner in the developer adheres to the electrostatic latent image on the photoconductor 10. Thus, a toner image is formed on the photoconductor 10. After the toner therein is thus consumed, the developer on the surface of the developing roller 12a is returned to the second conveying screw 12c as the developing roller 12a rotates (the surface of the developing roller 12a moves). The developer transported to the end (on the back side of the sheet on which FIG. 2B is drawn) of the second developer compartment R2 by the second conveying screw 12c is returned to the first developer compartment R1. Thus, the developer is circulated inside the developing device 12.

The developing device 12 further includes a toner concentration sensor 124 (illustrated in FIG. 5) disposed on the downstream side in the developer conveyance direction of the first conveying screw 12b, to detect the concentration (or percentage) of toner in the developer in the first developer compartment R1. For example, the toner concentration sensor 124 measures the toner concentration based on the magnetic permeability of the developer. As the toner concentration decreases, the magnetic carrier becomes denser, and the magnetic permeability increases. When a value detected by the toner concentration sensor 124 deviates from a target value (threshold), toner is supplied from a toner bottle 20 (illustrated in FIG. 1), serving as a toner container, to the developing device 12 to keep the toner concentration constant or substantially constant. For the target value, a reference toner pattern is formed on the photoconductor 10, and an optical sensor detects the amount of toner adhering to the toner pattern. The target value is determined based on the detected toner adhesion amount.

Although the toner concentration is thus controlled to keep the density of the reference toner pattern on the photoconductor 10 constant, decreases in the density of the reference pattern are inevitable when the toner bottle 20 becomes empty. In such a case, the toner adhesion amount of the toner pattern, detected by the optical sensor, does not recover despite the operation to supply the toner from the toner bottle 20. Accordingly, a controller of the image forming apparatus 500 determines (or estimates) that there is no toner (toner depletion).

The cleaning device 14 includes a cleaning blade 14a that contacts or abuts against the photoconductor 10 to scrape off the toner adhering to the photoconductor 10 after a transfer process. The cleaning device 14 further includes a toner collecting coil 14b disposed in a collected toner compartment W to transport the toner collected by the cleaning blade 14a. The toner collected by the toner collecting coil 14b is further transported by a toner conveyance device to either the developing device 12 or a waste-toner bottle.

Next, a configuration and operation of the developing device 12 is described in further detail below.

Figure 3:
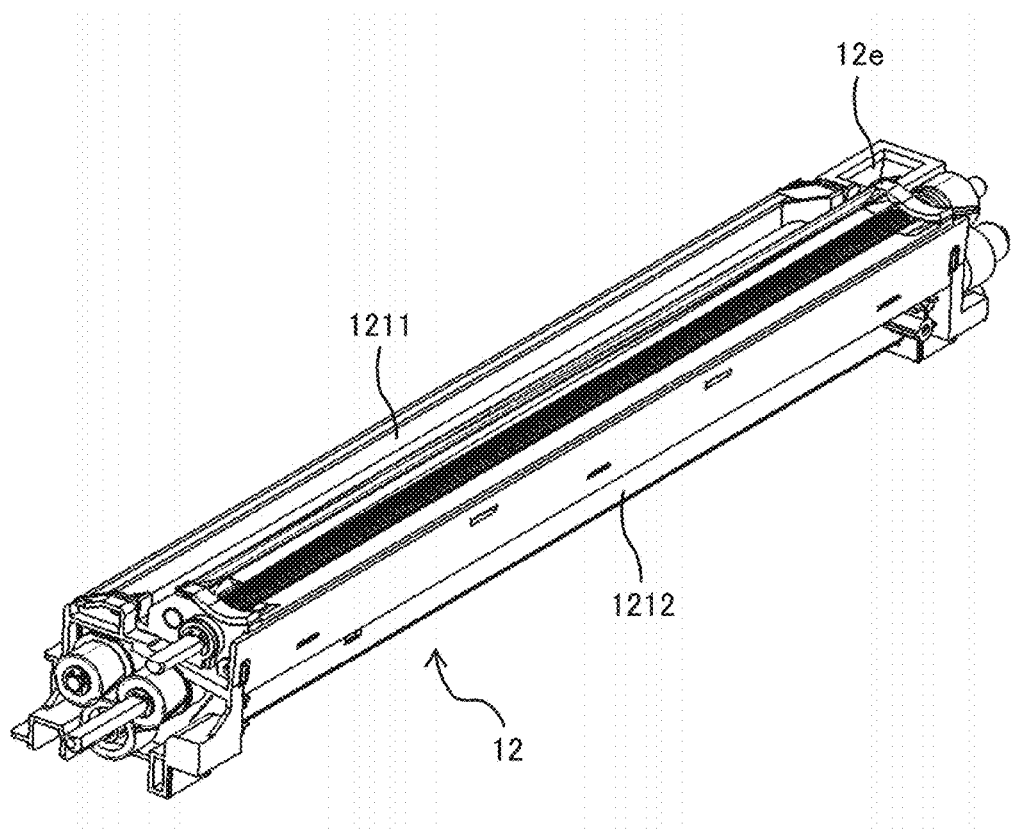
FIG. 3 is a perspective view of a developing device according to an embodiment.
Figure 4:
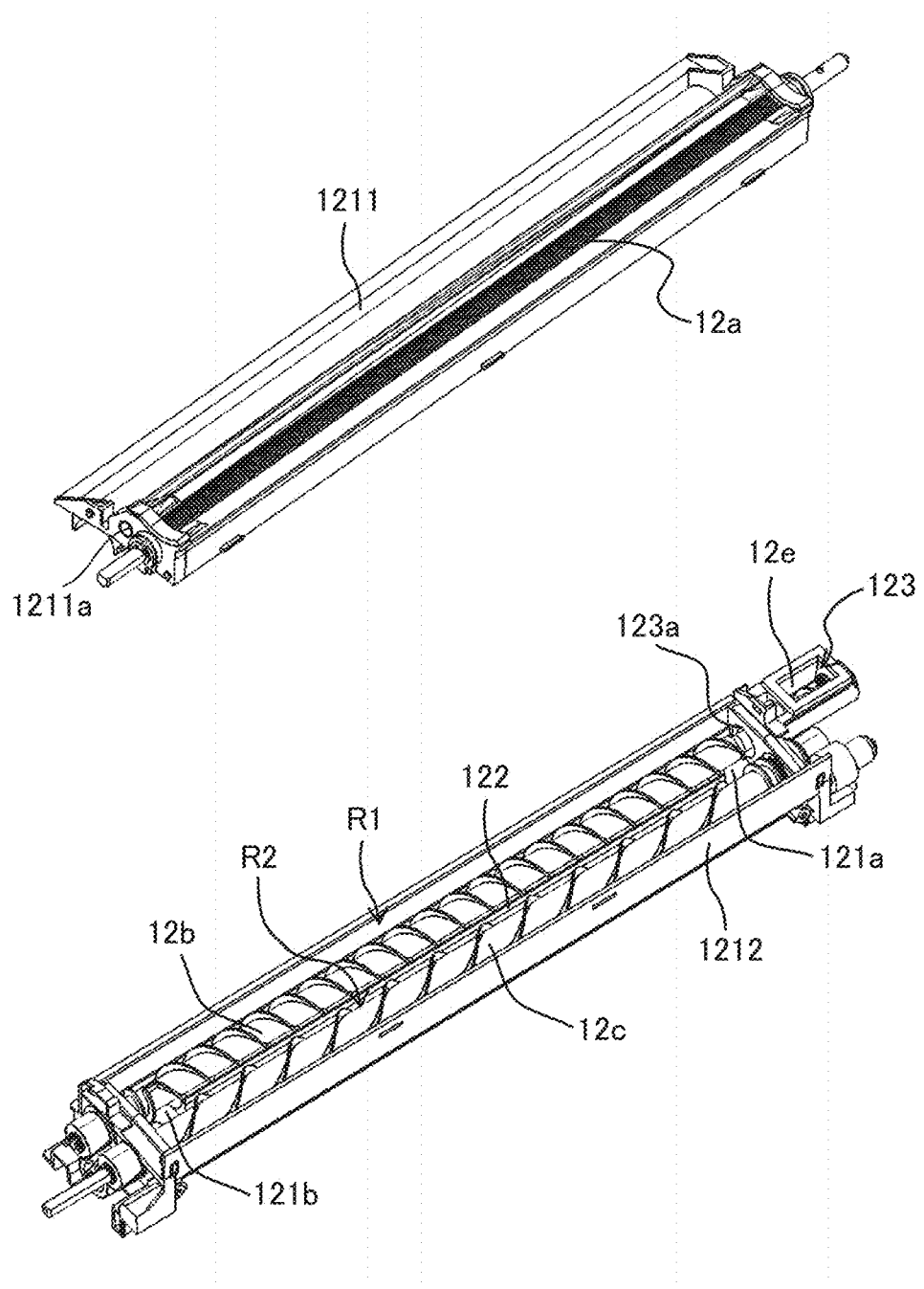
FIG. 4 is a perspective view of the developing device illustrated in FIG. 3, divided into an upper case and a lower case.
Figure 5:
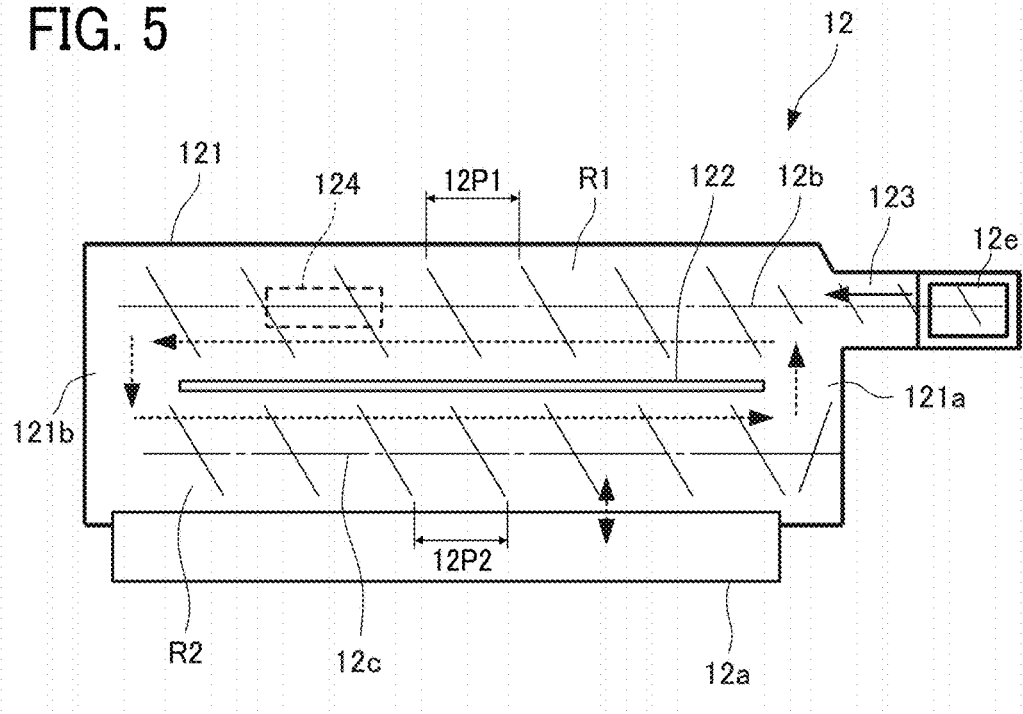
FIG. 5 is a schematic view illustrating a developer circulation passage in the developing device illustrated in FIG. 3.

FIG. 3 is a perspective view that illustrates an exterior of the developing device 12 illustrated in FIGS. 2A and 2B. FIG. 4 is a perspective view of the developing device 12 from which a developing casing 121 is removed to illustrate an interior of the developer compartments. In FIG. 4, the developing casing 121 is divided into an upper case 1211 and a lower case 1212. FIG. 5 is a schematic diagram illustrating a developer circulation passage of the in the developing device 12. In FIG. 5, broken lines represent the flow of the developer, and solid lines represent the flow of the toner supplied from a toner supply inlet 12e illustrated in FIG. 3.

As the upper case 1211 and the lower case 1212 are attached to each other as illustrated in FIG. 4, the developing device 12 illustrated in FIG. 3 is constructed. In FIG. 4, the developing roller 12a and the developer doctor 12d are attached to the upper case 1211, and two conveying screws, the first conveying screw 12b and the second conveying screw 12c, are attached to the lower case 1212.

The developing casing 121 illustrated in FIG. 5 defines the developer containing compartments inside the developing device 12. A partition 122 divides the developer containing compartment into the first developer compartment R1 and the second developer compartment R2. The first and second conveying screws 12b and 12c are disposed in the first and second developer compartments R1 and R2, respectively. The first developer compartment R1 communicates with the second developer compartment R2 through openings 121a and 121b located at ends of the partition 122.

At the downstream end of the second developer compartment R2 in the direction in which the second conveying screw 12c transports the developer in the direction indicated by arrow Y2 in FIG. 2A, the developer moves to the first developer compartment R1, through the opening 121a at the end of the partition 122. Inside the first developer compartment R1, while stirring the developer, the first conveying screw 12b transports the developer in the direction opposite the direction in which the developer moves inside the second developer compartment R2. At the downstream end of the first developer compartment R1 in the direction in which the first conveying screw 12b transports the developer, the developer moves through the opening 121b at the end of the partition 122 to the second developer compartment R2.

Thus, the first and second conveying screws 12b and 12c disposed in the first and second developer compartments R1 and R2, respectively, circulate the developer inside the developer containing compartment partitioned by the partition 122.

The upstream end of the first developer compartment R1 in the developer conveyance direction communicates with a toner supply passage 123. The toner supply inlet 12e is disposed in the toner supply passage 123. Through the toner supply inlet 12e, fresh toner and the toner collected by the cleaning device 14 are supplied. The first conveying screw 12b disposed in the first developer compartment R1 extends into the toner supply passage 123. The first developer compartment R1 communicate with the toner supply passage 123 through a communication opening 123a. The toner supplied from the toner supply inlet 12e is transported by the first conveying screw 12b inside the toner supply passage 123 and transported to the first developer compartment R1 through the communication opening 123a. In FIG. 5, the toner concentration sensor 124 to detect the toner concentration of the developer is disposed below the first developer compartment R1 of the developing casing 121.

Figure 6:
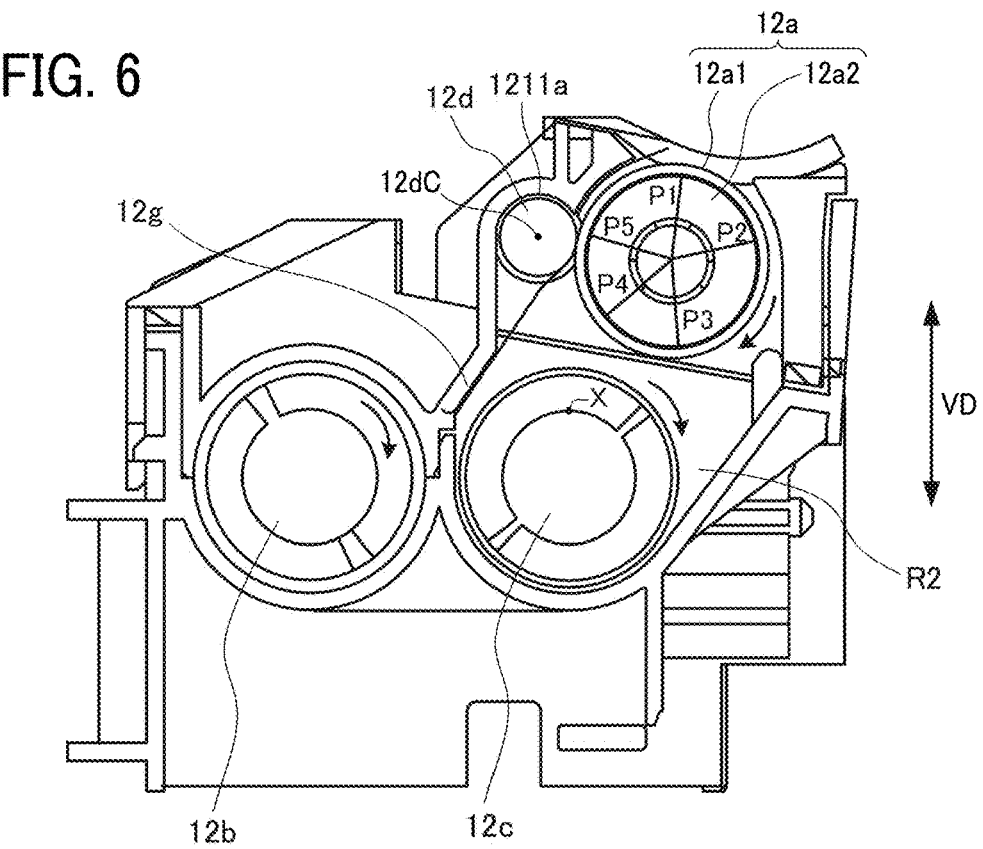
FIG. 6 is an enlarged partial view of the developing device illustrated in FIG. 3 and illustrates the periphery of a developing roller, a conveying screw, and a developer doctor therein.

FIG. 6 is an enlarged view of a portion of the developing device 12 illustrated in FIG. 2 including the developing roller 12a, the first conveying screw 12b, the second conveying screw 12c, and the developer doctor 12d, together with magnetic poles P1 to P5 of the magnet roller 12a2, serving as a magnetic field generator, inside the developing roller 12a. In FIG. 6, references P1 to P5 are positioned at angular positions of peaks of the normal direction magnetic force (magnetic flux density) of the magnetic poles.

In FIG. 6, the developing device 12 further includes a guide plate 12g secured to the casing 121 of the developing device 12. The guide plate 12g covers a portion above the second conveying screw 12c and extends substantially linearly to the vicinity of a regulating portion where the developer doctor 12d regulates the developer. One end of the guide plate 12g abuts against (contacts) the developer doctor 12d so that the guide plate 12g sags toward the developing roller 12a. In addition, the developer doctor 12d is made of a columnar bar. The developer doctor 12d is a solid rod cut from a base material, subjected only to end-face treatment. As the developer doctor 12d is simply inserted into a hole 1211a of the upper case 1211, the developer doctor 12d is attached thereto. Thus, the production cost can be low and precise positioning can be attained.

A center 12dC (axis) of the developer doctor 12d is located above the rotation center of the developing roller 12a in the vertical direction indicated by arrow VD in FIG. 6. The position where the developer doctor 12d and the developing roller 12a oppose to each other is also positioned above the rotation center of the developing roller 12a in the vertical direction VD.

Figure 7:
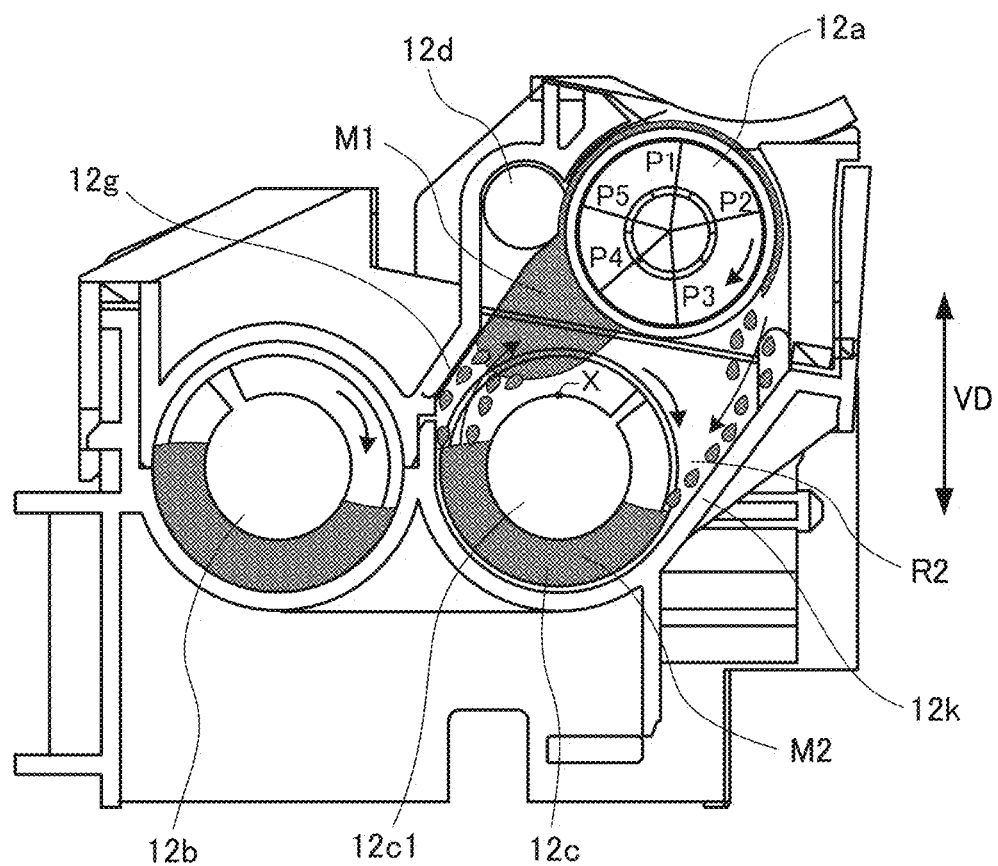
FIG. 7 is a schematic diagram illustrating behaviors of developer from scooping-up to release and height of developer surface in the developing device according to an embodiment.

FIG. 7 schematically illustrates the behavior of developer from scooping-up to release from the developing roller 12a and the height of the developer surface in the developing device 12 according to the present embodiment. Referring to FIG. 7, descriptions are given below of a sequence of behavior of developer from when the developer is pumped up to the second conveying screw 12c, conveyed through the developing range, separated from the developing roller 12a into the second developer compartment R2, and mixed and stirred with the developer therein. In FIG. 7, the developer is represented by gray hatching, and both the second conveying screw 12c and the developing roller 12a are rotated clockwise.

The magnetic pole P1 opposed to the photoconductor 10 is a developing magnetic pole (north pole or N pole). The magnetic pole P2 (hereinafter also "developer release pole P2") and the magnetic pole P3 (hereinafter also "developer scooping pole P3"), which are adjacent to each other in the direction of rotation of the developing roller 12a, are identical in polarity (south pole or S pole). The magnetic poles P2 and P3 together generate a magnetic force to release the developer from the developing sleeve 12a1. The magnetic pole P4 (hereinafter also "conveyance pole P4") has a polarity (N pole) different from the polarity of the developer release pole P2 and the developer scooping pole P3 and exerts a magnetic force to attract the developer from the second developer compartment R2. Further, the magnetic pole P5 facing the developer doctor 12d is a regulation pole (S pole).

As the second conveying screw 12c rotates, on the side where the rotation of the shaft of the second conveying screw 12c is directed upward (on the left in the drawing), the developer is lifted and the developer surface ascends. By contrast, on the opposite side (downstream side or on the right in the drawing), the developer sinks and the developer surface descends. Immediately after the second conveying screw 12c stop rotating, the level of the developer is higher on the left than on the right in FIG. 7, although the difference is leveled to a certain degree. The term "height of developer surface" used in this disclosure represents the height of the developer immediately after the second conveying screw 12c stops rotating.

As the second conveying screw 12c rotates, on the left in FIG. 7 of the rotation axis of the second conveying screw 12c, the developer is lifted upward and retained by the magnetic force exerted by the conveyance pole P4 of the developing roller 12a. As the developing sleeve 12a1 rotates, the developer is conveyed to the developer doctor 12d serving as the developer regulator. After the developer doctor 12d removes excess developer, the toner in the developer is used in developing in the developing range facing the photoconductor 10. Then, due to the repulsive magnetic force exerted by the developer release pole P2, the developer is separated from the developing roller 12a and falls into the second developer compartment R2.

In the present embodiment, the second conveying screw 12c has an outer diameter of 17 mm, a shaft diameter of 11 mm, and a blade height of 3 mm. In this configuration, the ratio of the screw shaft diameter to the screw outer diameter is approximately 65%.

In FIG. 7, the highest position in the vertical direction indicated by arrow VD of a shaft 12c1 of the second conveying screw 12c is defined as a vertex X, and the second developer compartment R2 includes an inclined face 12k to guide the developer. The developing device 12 according to the present embodiment is configured such that the developer separated from a region between the developer release pole P2 and the developer scooping pole P3 of the developing roller 12a falls on the inclined face 12k disposed lower than the vertex X and on the right in FIG. 7 (on the side where the second conveying screw 12c rotates downward).

The dropped developer moves into the second conveying screw 12c along the inclination of the inclined face 12k. Guiding the developer to fall on the inclined face 12k is advantageous in that the fallen developer is not retained by the magnetic force exerted by the developer scooping pole P3, thereby inhibiting re-scooping of developer used in developing. Specifically, the developer fallen into the second developer compartment R2 is mixed with the developer therein and sinks down as the second conveying screw 12c rotates. The used developer is thus agitated and mixed with the developer in the second developer compartment R2 to make the toner concentration uniform, after which the developer is conveyed up again and scooped up.

Figure 8A:
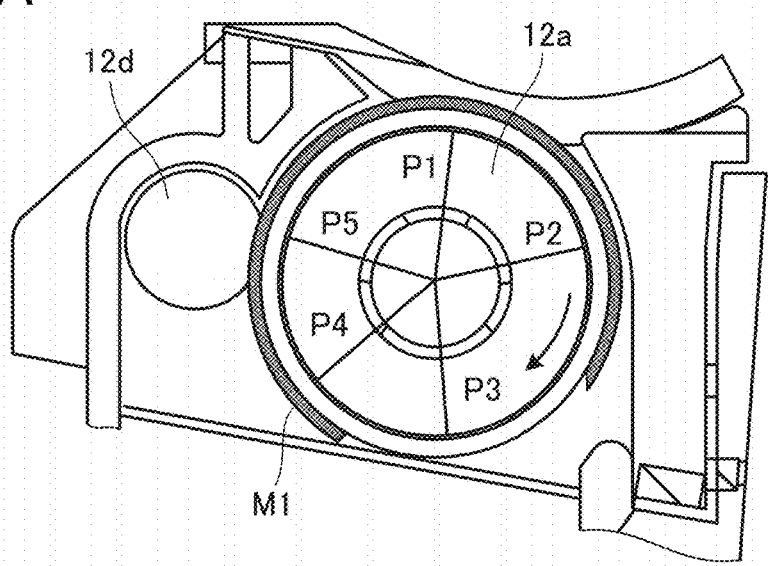
FIGS. 8A and 8B are partial enlarged views illustrating the distribution of developer in a state where the developing device is not operating, according to the embodiment.
Figure 8B:
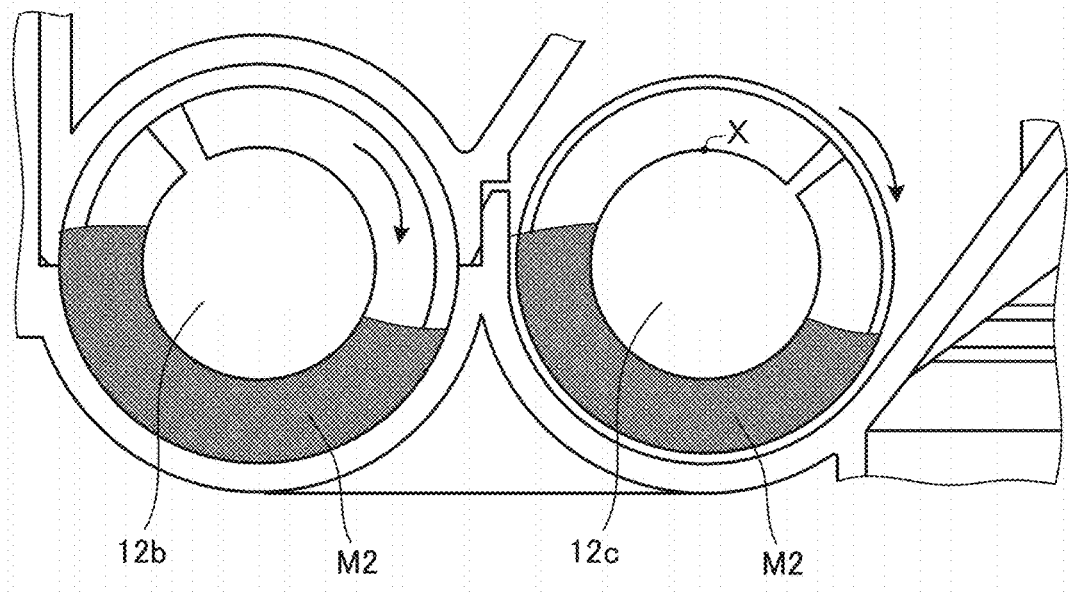

FIGS. 8A and 8B illustrate a state in which the operation of the developing device 12 is stopped, that is, a state in which the developing roller 12a, the first conveying screw 12b, and the second conveying screw 12c are not operating. FIG. 8A is a partial enlarged view of the vicinity of the developing roller 12a, and FIG. 8B is a partial enlarged view of the vicinity of the first conveying screw 12b and the second conveying screw 12c. In the state illustrated in FIG. 8A, the amount of developer borne on the developing roller 12a is referred to as a developer amount M1 (weight). In the state illustrated in FIG. 8B, developer of amount M2 (weight) is present on the side of the first conveying screw 12b and the second conveying screw 12c.

Next, descriptions are given below of the relation between the pitch and rotation speed of the first and second conveying screws 12b and 12c, the amount of the developer; and the density unevenness corresponding to screw pitch, in the developing devices 12 according to the present embodiment.

Table 1 is a result of an experiment performed to evaluate the degree of density unevenness when pitches 12P1 and 12P2 (see FIG. 5) of the first and second conveying screws 12b and 12c, the rotation speed, and the total amount of developer are changed. In Table 1, settings of these parameters are presented as Comparative Examples 1 to 8 (CE1 to CE8) and Examples 1 to 3 (E1 to E3) according to the present embodiment. As the ratings, "Good" representing that image density is uniform and image quality is preferable, "Not Good" representing that image density is slightly uneven, and "Bad" representing that image density is uneven are indicated in the column "Rating" in Table 1.

TABLE 1

| | First Conveying Screw Pitch (mm)/ Rotation Speed (rpm) | Second Conveying Screw Pitch (mm)/ Rotation Speed (rpm) | Total Developer Amount (g) | M1 (g) | M1/L1 (g/cm) | M1/M2 | Rating |
|---|---|---|---|---|---|---|---|
| CE1 | 30/300 | 30/300 | 90 | 8.2 | 0.27 | 0.20 | Bad |
| CE2 | 30/400 | 30/400 | 90 | 9.8 | 0.32 | 0.24 | Bad |
| CE3 | 30/500 | 30/500 | 90 | 10.4 | 0.34 | 0.25 | Bad |
| CE4 | 40/300 | 30/300 | 90 | 12.5 | 0.41 | 0.32 | Bad |
| CE5 | 40/400 | 30/400 | 90 | 13.0 | 0.42 | 0.34 | Bad |
| CE6 | 50/300 | 30/300 | 90 | 16.4 | 0.53 | 0.43 | Bad |
| CE7 | 40/500 | 30/500 | 90 | 17.2 | 0.56 | 0.50 | Good |
| CE8 | 50/400 | 30/400 | 90 | 17.5 | 0.57 | 0.46 | Not Good |
| E1 | 50/500 | 30/500 | 90 | 19.0 | 0.62 | 0.52 | Good |
| E2 | 50/500 | 40/500 | 120 | 31.5 | 1.02 | 0.79 | Good |
| E3 | 50/500 | 30/500 | 120 | 34.0 | 1.10 | 0.73 | Good |

Figure 10:
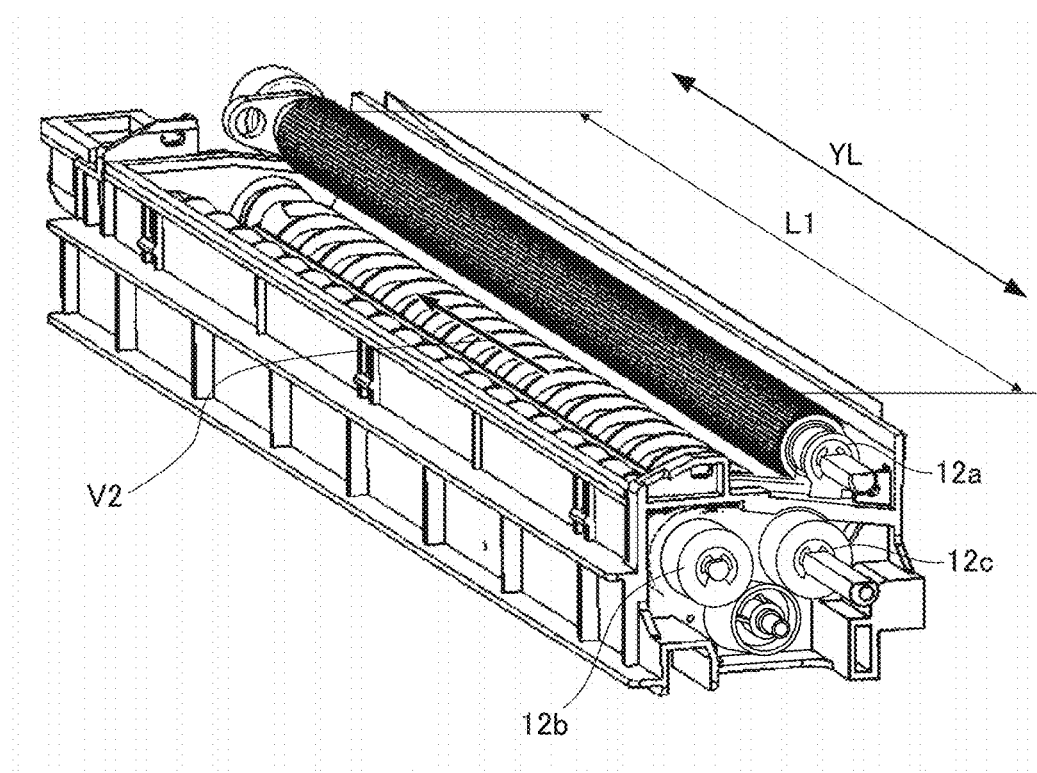
FIG. 10 is a perspective view of the developing device illustrating a developer bearing width on the developing roller and the speed at which the developer moves parallel to the axial direction of the developing roller, in a developer circulation passage containing a second conveying screw according to an embodiment.

The developer amount M1 is a parameter representing the amount of developer borne on the developing roller 12a by the magnetic force in a state where the operation of the developing device 12 is stopped (see FIG. 8A). The developer amount M2 is a parameter representing the amount of developer calculated by deducting the amount M1 borne on the developing roller 12a from the total developer amount in the developing casing 121 (see FIG. 8B). A developer bearing width L1 represents a width of a range in which the developing roller 12a bears the developer, in the longitudinal direction of the developing roller 12a (see FIG. 10). That is, the developer bearing width L1 is the distance between the longitudinal ends of the magnetic poles P1 to P5 inside the developing roller 12a.

Figure 9:
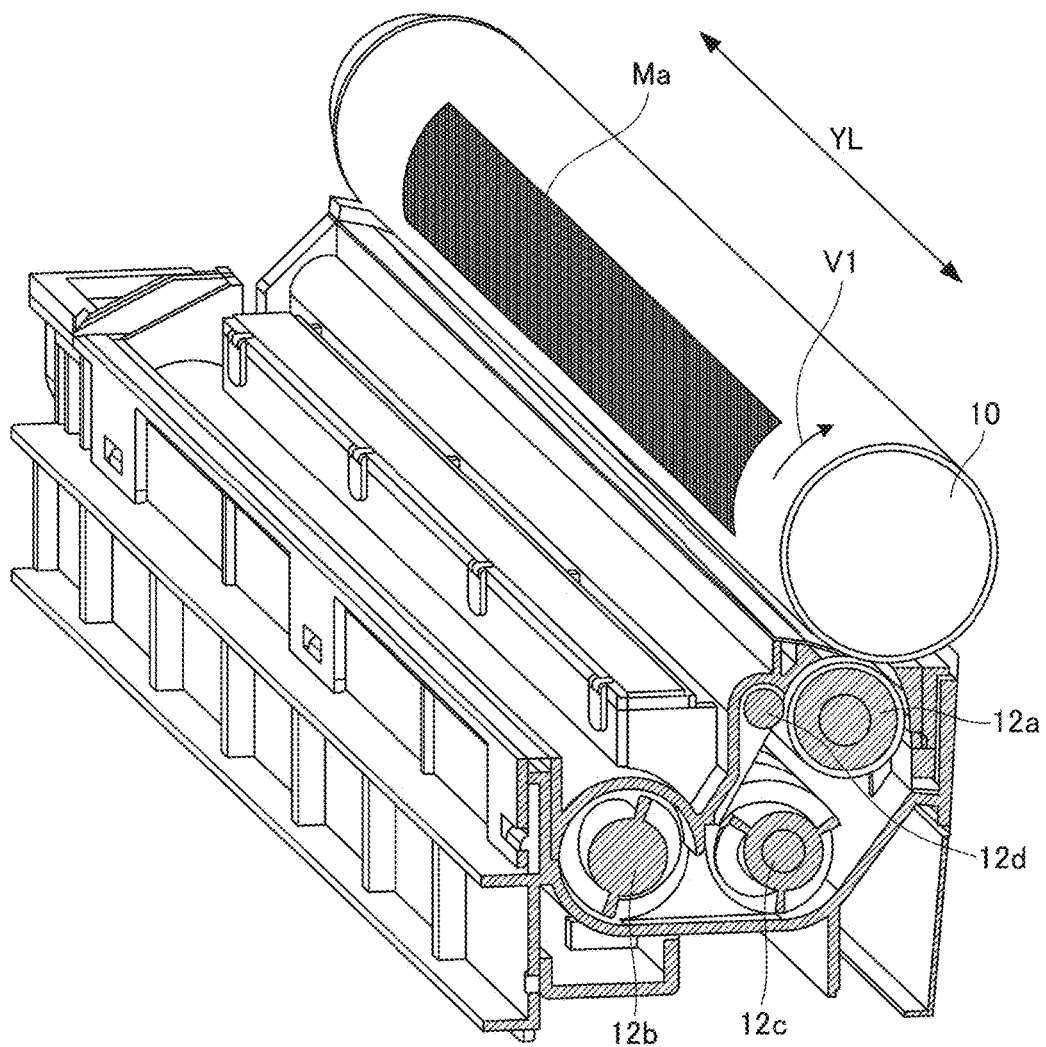
FIG. 9 is a perspective view for explaining the weight per unit area of toner to be consumed in developing and the speed of rotation of an image bearer, according to an embodiment.
Figure 11:
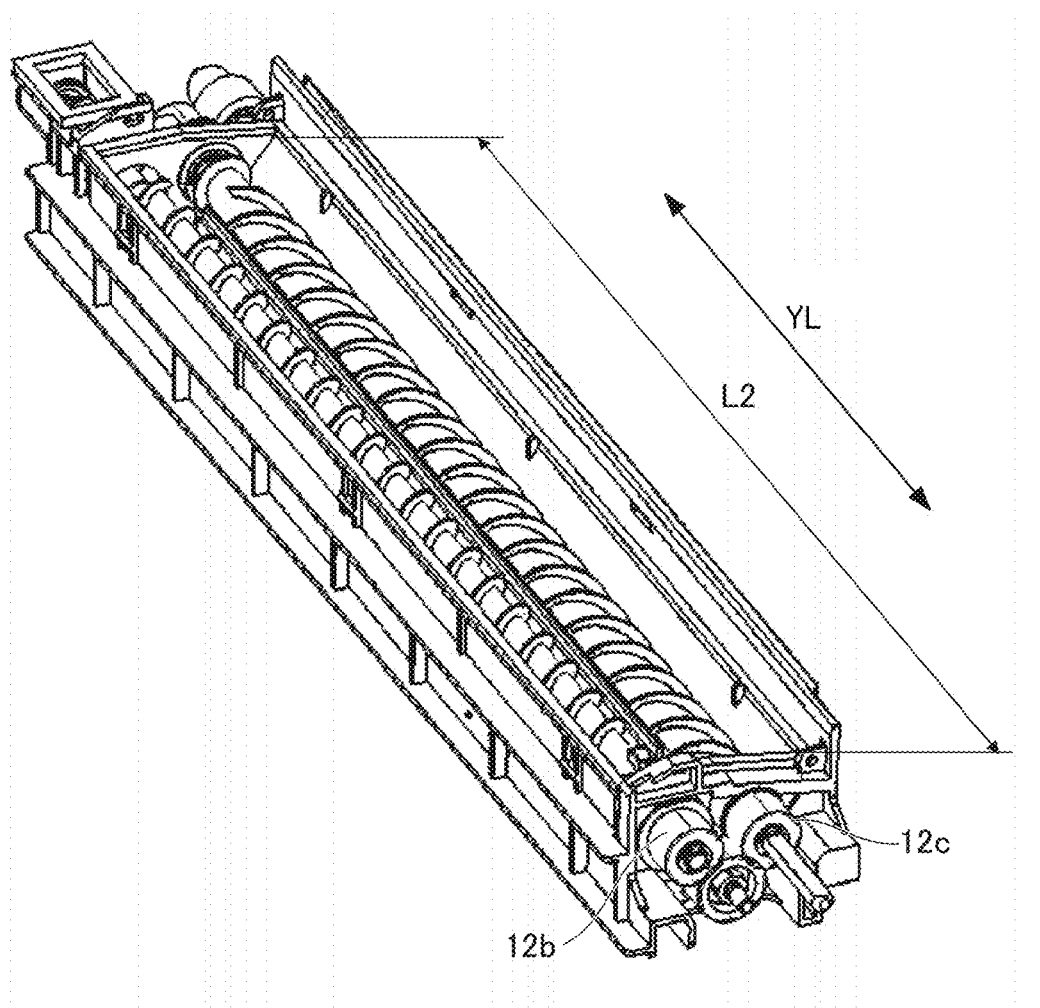
FIG. 11 is a perspective view illustrating the developer circulation passage containing the second conveying screw illustrated in FIG. 10.

Further, a toner weight Ma represents the maximum weight per unit area of toner consumable in developing on the photoconductor 10 (see FIG. 9). A largest sheet width Lp represents the maximum width of the sheet S in which the developing device 12 can perform developing in the longitudinal direction of the developing device 12. A length L2 represents the length, in the longitudinal direction of the developing device 12, of the second developer compartment R2 (the developer circulation passage) containing the second conveying screw 12c, which is the closer to the developing roller 12a of the first and second conveying screws 12b and 12c (see FIG. 11). A rotation speed V1 is a parameter representing the rotation speed (speed of movement of surface) of the photoconductor 10. A speed V2 is a parameter representing the speed at which the developer in the second developer compartment R2 is conveyed by the second conveying screw 12c in the direction parallel to the axial direction of the developing roller 12a.

The developer amounts M1 and M2 are measured in the developing device 12 not operating. The developer amount M1 is the amount of developer borne, with the magnetic force, on the developing roller 12a taken out from the developing casing 121. The developer (having the developer amount M1) attracted by the magnetic force of the developing roller 12a can be removed when a magnet is brought close to the developing roller 12a from the outside. The developer amount M2 is the amount of developer remaining in the developing casing 121 when the developing roller 12a is removed from the developing casing 121.

Here, the ratio of the developer amount M1 to the developer bearing width L1 (M1/L1) is focused. In Comparative Example 7 (CE7), the value of M1/L1 is 0.56 (g/cm) and the rating is "Good". However, in Comparative Example 8 (CE8), the value of M1/L1 is 0.57 (g/cm) and the rating is "Not Good". In each of Comparative Examples 1 to 6, the value of M1/L1 is 0.53 (g/cm 3) or smaller, and the raging is "Bad". In each of Examples 1 to 3 (E1 to E3) according to the present embodiment, the value of M1/L1 is 0.62 (g/cm) or greater, and the rating is "Good".

From the result of Comparative Example 7, conceivably, when the value of M1/L1 is 0.56 (g/cm 3) or greater, the amount of developer borne on the developing roller 12a increases, achieving good results. However, from the result of Comparative Example 8, even when a relatively large amount of developer is borne on the developing roller 12a, the result is not satisfactory. Therefore, the inventors have keenly considered other factors than the value of M1/L1 as a factor affecting the results and have found a cause. That is, the relation between the developer amounts M1 and M2 also influences the result.

The ratio between the developer amounts M1 and M2 (M1/M2) is focused. In Comparative Example 7, the value of M1/M2 is 0.50 and the rating is "Good". However, in Comparative Example 8, the value of M1/M2 is 0.46 and the rating is "Not Good". In each of Comparative Examples 1 to 6, the value of M1/M2 is 0.43 or smaller, and the rating is "Bad". In each of Examples 1 to 3 according to the present embodiment, the value of M1/M2 is 0.52 or greater, and the rating is "Good".

According to the above-described evaluation, the image density can be uniform when the following two conditions are satisfied: 1) the value of M1/L1 is 0.56 (g/cm) or greater, preferably, 0.62 (g/cm) or greater; and 2) the value of M1/M2 is 0.50 or greater, preferably 0.52 or greater.

From the above finding, the conditions to inhibit uneven image density are defined by Formulas 1 and 2 below.

$$M1/L1 > 0.56 \text{ g/cm} \quad \text{Formula 1}$$

$$M1/M2 > 0.50 \quad \text{Formula 2}$$

Generally, as the amount of developer in the developing device is reduced, the possibility of occurrence of uneven image density corresponding to the screw pitch of the conveying screw increases. However, according to the experimental results in Table 1, even in the state where the amount of developer in the developer circulation passage is relatively small as defined in Formula 2, uneven image density corresponding to the screw pitch can be suppressed as long as the amount of developer held upstream from the developer doctor in the direction of rotation of the developer bearer is equal to a predetermined amount or greater, as defined in Formula 1.

From the above finding, when the necessary amount of developer is retained upstream from the developer doctor 12d as defined by the condition expressed in Formula 1, the layer thickness can be stable in the developer transported downstream from the developer doctor 12d and uniform image density can be attained. Further, satisfying the condition expressed in Formula 2 can minimize the amount of developer required in the developing device 12. In other words, satisfying Formulas 1 and 2 and securing compatibility therebetween can suppress uneven image density corresponding to the screw pitch.

Further, considerations are given to changes in the concentration of toner in the longitudinal direction from upstream to downstream in the developer conveyance direction.

A largest development amount (toner consumption) per unit time when developing is performed entirely in the sheet width is calculated as Ma×V1×Lp, where Ma represents the amount (weight) per unit area of toner consumed in developing on the photoconductor 10; V1 represents the rotation speed of the photoconductor 10; and Lp represents a largest width of the sheet S (hereinafter "largest sheet width") printable in the image forming apparatus 500. The largest sheet width Lp is smaller than the developer bearing width L1 on the developing roller 12a and (Lp<L1). Additionally, the time required for the developer to pass through the second developer compartment R2 (the developer circulation passage) containing the second conveying screw 12c (the closer of the developer conveyors to the developing roller 12a) is expressed as L2/V2. Therefore, the amount of toner consumed in developing in the time L2/V2, during which the developer passes through the developer circulation passage, is expressed as Ma×V1×Lp×L2/V2.

The ratio of the toner amount expressed as Ma×V1×Lp×L2/V2 to the amount of developer (M1+M2) supplied to developing during the time L2/V2 is expressed as (Ma×V1×Lp×L2/V2)/(M1+M2) and represents the difference in toner concentration between the extreme upstream and extreme downstream in the developer circulation passage (the second developer compartment R2). When the above-expressed difference in toner concentration is smaller than a given threshold, uneven image density is small. In the present embodiment, the difference in toner concentration is smaller than, for example, 0.01 (the threshold) to further avoid uneven image density, as expressed as:

$$(Ma \times V1 \times Lp \times L2/V2)/(M1+M2) < 0.01 \quad \text{Formula 3}$$

The parameters V2, M1 and M2 can be controlled with the changes in the shape of the spiral second conveying screw 12c, the rotation speed, and the magnetic pole arrangement of the developing roller 12a. That is, density unevenness can be avoided by adjusting the parameters V2, M1, and M2.

For example, typical parameters of the screw shape are the outer diameter and the lead angle. Referring to FIG. 5, the lead angle of a conveying screw is an angle between a spiral blade face and a virtual plane perpendicular to the rotation axis of the conveying screw. In general, when the lead angle of a spiral conveying screw is too small, the speed of conveyance of developer is slow, and the speed of conveyance of developer increases as the lead angle increases. However, when the lead angle is too large, an action to push out the developer outward in the radial direction becomes stronger than the action to move the developer in the axial direction. Accordingly, the speed of conveyance of developer decreases. The speed V2 increases as the outer diameter of the screw increases. In a read angle range of from 0 to 30 degrees, the speed V2 increases as lead angle increases. In a range exceeding 30 degrees, the action to convey the developer in the axial direction decreases and the action to flips up the developer in the direction perpendicular to the axis becomes stronger.

In the present embodiment, a lead angle θ is in a range defined by Formula 4 so that the speed V2 is relatively high, flipping-up of developer is inhibited, and periodic image density unevenness corresponding to screw pitch is suppressed.

$$35/17\pi < \tan\theta < 50/17\pi \quad \text{Formula 4}$$

As the rotational speed of the screw increases, the action to convey the developer in the axial direction and the action to flip up the developer perpendicular to the shaft become stronger.

Regarding the magnetic pole arrangement of the developing roller 12a, the developer amount M1 increases as the magnetic force of the magnetic pole upstream from the developer doctor 12d (the developer regulator) becomes stronger. Changing such parameters results in changes in the balance in amount of developer in the developing device 12, and the developer amounts M1 and M2 change accordingly.

In the present embodiment, the components of the developing devices 12 are arranged, for example, as illustrated in FIG. 7. Further, when the toner weight Ma is 0.7 mg/cm² and the rotation speed V1 of the photoconductor 10 is 256 mm/s, the second conveying screw 12c has the following configuration. The outer diameter is 17 mm, the shaft diameter is 11 mm, the rotation speed is 500 revolutions per minute (rpm), a pitch P1 is 45 mm, and the number of threads is three to satisfy Formulas 1 to 3. In such a configuration, the magnetic pole arrangement of the developing roller 12a and the magnetic pole specifications are as illustrated in FIG. 7.

Figure 12:
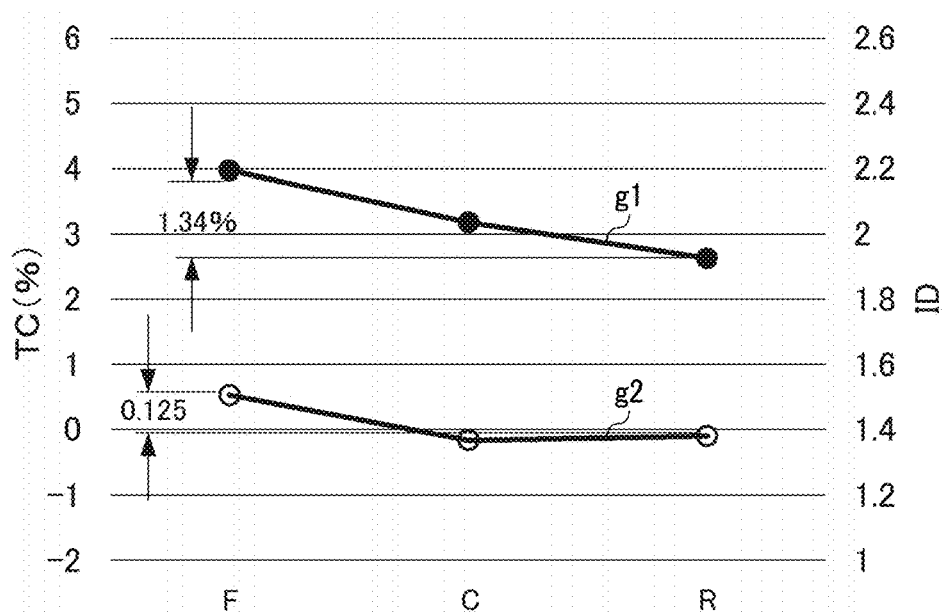
FIG. 12 is a graph of changes and variations in toner concentration and image density on the upstream side and the downstream side in the developer circulation direction, in a comparative developing device.
Figure 13:
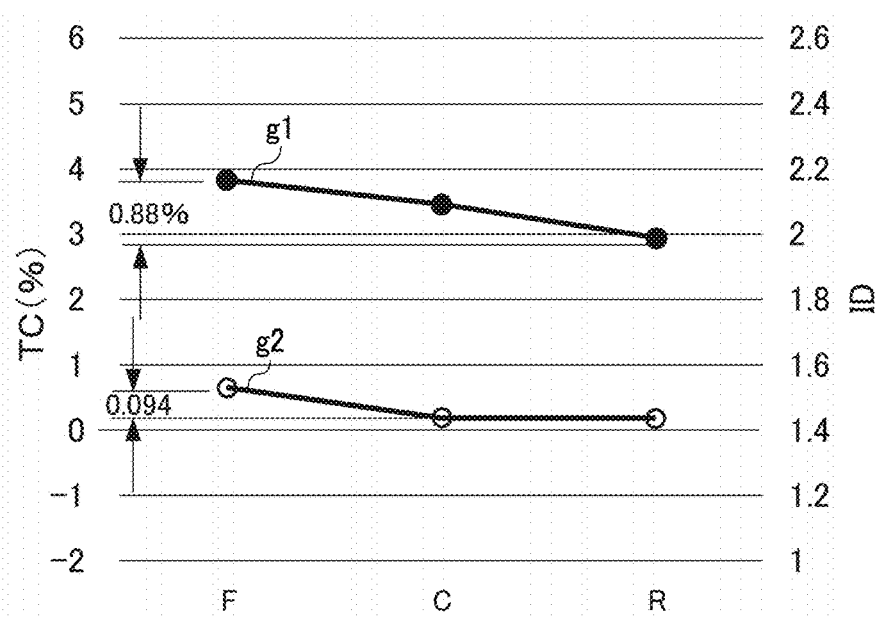
FIG. 13 is a graph of changes and variations in toner concentration and image density on the upstream side and the downstream side in the developer circulation direction, in the developing device according to an embodiment.

Descriptions are given below of suppression of uneven image density, with reference to FIGS. 12 and 13. FIG. 12 is a graph of changes and variations in toner concentration TC and image density ID on the upstream side and the downstream side in the developer circulation direction, in a comparative configuration in which the configuration defined by Formula 3 is not adapted. FIG. 13 is a graph of changes and variations in toner concentration TC and image density ID on the upstream side and the downstream side in the developer circulation direction, in the configuration according to the present embodiment, satisfying Formula 3. In FIGS. 12 and 13, the upstream side, a center area, and the downstream side in the developer circulation direction are represented as "F", "C", "R", respectively. In each of FIGS. 12 and 13, a graphs g1 represents toner concentration (TC) after consecutive printing of solid images, and a graphs g2 represents image density (ID) after consecutive printing of solid images. The image density variation is the difference in image density between a highest image density and a lowest image density.

Regarding the results presented in FIGS. 12 and 13, the image density variations and relating toner concentration variations are used to evaluate suppression of uneven image density. Specifically, the uneven image density is evaluated as being suppressed when the image density variation is less than 0.1 and the toner concentration variation is less than 1%. The toner concentration variation being less than 1% is equivalent to the condition defined by Formula 3.

In the configuration not adapting the condition defined by Formula 3, as illustrated in FIG. 12, the toner concentration variation is 1.34% and the image density variation is 0.125. That is, the image density is slightly uneven. By contrast, in the configuration satisfying Formula 3, as illustrated in FIG. 13, the toner concentration variation is 0.88% and the image density variation is 0.094. That is, uneven image density is inhibited.

As described above, satisfying Formulas 1 and 2 is effective in suppressing uneven image density corresponding to the screw pitch, and further satisfying Formula 3 or 4 is effective in suppressing image density variations.

In addition, the first conveying screw 12c has a plurality of screw threads, the number of which in the present embodiment is three. In a conveying screw, as the number of threads increases, the efficiency in conveyance of developer in the axial direction is enhanced, and the developer can be reliably conveyed. In particular, a satisfactory image can be attained with a small amount of developer when the lead angle of the conveying screw is increased to secure the developer amount M1 borne on the developing roller 12a. However, increasing the lead angle results in decreases in the conveying speed in the axial direction of the conveying screw, and satisfying Formula 3 is difficult. Therefore, a conveying screw having the plurality of screw threads is used to secure the developer amount M1 borne on the developing roller 12a and to easily attain both of securing the developer amount M1 and satisfying the condition defined by Formula 3.

As described above, according to an aspect of this disclosure, the developing device 12 includes the developing roller 12a including the magnetic field generator therein, and the first and second conveying screws 12b and 12c to convey developer. The second conveying screw 12c is positioned below or lower than the developing roller 12a. In this configuration, the developing device 12 satisfies M1/L1>0.56 g/cm (Formula 1) and M1/M2>0.50 (Formula 2), where M1 represents the developer amount borne on the developing roller 12a by the magnetic force of the magnetic field generator, M2 represents the developer amount in the developing casing 121 excluding the developer borne on the developer amount M1, and L1 represents the developer bearing width in the longitudinal direction of the developing roller 12a.

When Formula 1 is satisfied in the developing device 12, the amount of developer stored upstream from the developer doctor 12d can be sufficient for stabilizing the layer thickness of the developer transported downstream from the developer doctor 12d, and images produced can be uniform in image density. Furthermore, when Formula 2 is satisfied, the amount of developer required in the developing device 12 can be minimized.

Therefore, even when the amount of developer (two-component developer including toner and magnetic carrier) is reduced, the developer can be supplied to the developing roller 12a using the developer being conveyed to the maximum extent, the amount of developer downstream from the developer doctor 12d can be stable, and a sufficient image density can be maintained. In a configuration employing magnetic one-component developer (magnetic toner) or any developer that can be borne on the developing roller 12a, instead of two-component developer, a sufficient image density can be maintained while maintaining a sufficient developer amount.

Further, the developing device 12 can be configured to satisfy, in addition to Formulas 1 and 2, Ma×V1/V2×Lp×L2/(M1+M2)<0.01 (Formula 3) where Ma represents the weight per unit area of toner to be consumed in developing on the photoconductor 10, Lp represents a maximum sheet width in which the apparatus can perform printing, L2 represents the length of the developer circulation passage containing the second conveying screw 12c, which is the closer of the first and second conveying screws 12b and 12c to the developing roller 12a, V1 represents the rotation speed of the photoconductor 10, V2 represents the speed at which the developer in the second developer compartment R2 (containing the second conveying screw 12c) moves in the direction parallel to the axial direction of the developing roller 12a.

When the developing device 12 satisfies Formula 3 in addition to Formulas 1 and 2, the ratio between the amount of toner consumed in developing while the developer passes through the developer circulation passage and the amount of developer supplied to the developing range, that is, the difference in toner concentration between the extreme upstream and the extreme downstream in the developer circulation passage, can be suppressed to a certain level or smaller, and variations in the image density can be reduced.

According to another aspect, the second conveying screw 12c is a developer conveyor disposed closer to the developing roller 12a and is a conveying screw, and the developing device 12 further satisfies 35/17π<tan θ<50/17π (Formula 4), where θ represents a lead angle at the outermost diameter of the spiral of the second conveying screw 12c.

With this configuration, the lead angle θ is kept within a certain range. Accordingly, the amount of developer flipped outward in the radial direction of the second conveying screw 12c can be suppressed while securing the speed of movement of developer in the axial direction of the second conveying screw 12c. Therefore, the developing device 12 can output a satisfactory image with a smaller amount of developer.

Further, in the developing device 12, the second conveying screw 12c can have a plurality of screw threads.

This configuration increases the efficiency in conveyance of developer in the axial direction of the second conveying screw 12c. Formula 3 is easily satisfied, and image density variations can be reduced. When the lead angle θ is increased to secure the developer amount M1 for attaining satisfactory image density, the speed of conveyance of developer in the axial direction of the second conveying screw 12c decreases. Since the conveying speed is secured even in such a case, image density variations can be reduced.

The process cartridge 1 according to the present embodiment includes the developing device 12, and at least the developing roller 12a and the photoconductor 10 are united together and removable from the apparatus body 100.

In this configuration, replacement and maintenance of the process cartridge 1 are facilitated. Additionally, in the process cartridge 1, the relative positions of the components can be kept at a higher degree of accuracy, thus enhancing the quality of images produced.

Further, the apparatus body 100 of the image forming apparatus 500 according to the present embodiment includes the process cartridge 1, and sufficient image quality can be obtained.

According to the aspect of this disclosure, even when the amount of developer is significantly reduced, the developer can be supplied to the developing roller 12a using the developer being conveyed to the maximum extent, the amount of developer downstream from the developer regulator can be stable, and a sufficient image density can be maintained. The above-described aspects are useful for developing devices, process cartridges and image forming apparatuses in general.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A developing device comprising:
    a casing to contain developer and define a developer circulation passage;
    a developing roller to bear the developer; and
    at least one developer conveyor to convey the developer and supply the developer to the developing roller, the at least one developer conveyor disposed in the developer circulation passage and lower than the developing roller,
    wherein the developing device satisfies:

$M1/L1 > 0.56$ g/cm; and $M1/M2 > 0.50$ where M1 represents an amount of developer borne on the developing roller, L1 represents a width in which the developing roller bears the developer in a longitudinal direction of the developing roller; and M2 represents an amount of developer stored in the casing and excluding the amount of developer borne.

2. The developing device according to claim 1, wherein the developer includes toner, and
    wherein the developing device satisfies:

$Ma \times V1/V2 \times Lp \times L2/(M1+M2) < 0.01$ where Ma represents a weight per unit area of the toner consumed in developing on an image bearer disposed opposite the developing roller, Lp represents a maximum sheet width in which the developing device performs developing, L2 represents a length of the developer circulation passage, V1 represents a rotation speed of the image bearer, and V2 represents a speed at which the developer in the developer circulation passage is conveyed by the at least one developer conveyor.

3. The developing device according to claim 1, wherein the at least one developer conveyor is a conveying screw that satisfies:

$35/17\pi < \tan \theta < 50/17\pi$ where θ represents a lead angle at an outer diameter of the conveying screw.

4. The developing device according to claim 1, wherein the at least one developer conveyor is a conveying screw having a plurality of screw threads.

5. An image forming apparatus comprising the developing device according to claim 1.

6. A process cartridge comprising:
    an image bearer to bear an image; and
    the developing device according to claim 1, to develop the image on the image bearer,
    wherein at least the developing roller and the image bearer are united together as a unit to be attached to and removed from an image forming apparatus.

7. An image forming apparatus comprising the process cartridge according to claim 6.

* * * * *